Oct. 10, 1939.　　O. G. WATT　　2,175,329
HEATING APPARATUS
Filed June 28, 1938　　5 Sheets-Sheet 1

INVENTOR.
Oscar G. Watt
BY Barry + Cyr
ATTORNEYS.

Oct. 10, 1939.     O. G. WATT     2,175,329
HEATING APPARATUS
Filed June 28, 1938     5 Sheets-Sheet 2

Inventor
Oscar G. Watt
Barry + Cyr
Atty

Oct. 10, 1939.        O. G. WATT        2,175,329
HEATING APPARATUS
Filed June 28, 1938        5 Sheets-Sheet 3

INVENTOR.
Oscar G. Watt
BY
Barry + Cyr
ATTORNEYS.

Oct. 10, 1939.　　　　O. G. WATT　　　　2,175,329
HEATING APPARATUS
Filed June 28, 1938　　　　5 Sheets-Sheet 4

INVENTOR.
Oscar G. Watt
BY Barry + Cyr
ATTORNEYS.

INVENTOR.
Oscar G. Watt
BY
Barry Cyr
ATTORNEYS.

Patented Oct. 10, 1939

2,175,329

UNITED STATES PATENT OFFICE 2,175,329

HEATING APPARATUS

Oscar G. Watt, Tulsa, Okla.

Application June 28, 1938, Serial No. 216,349

17 Claims. (Cl. 4—166)

This invention relates to improvements in a combined pedestal cabinet and heating unit, and more particularly, but not by way of limitation to a combined pedestal cabinet for use with a lavatory basin.

In many sections of the country where natural gas and individual heaters are employed for home heating purposes, the bathroom of the average home is heated by a small gas heater, usually having an open flame. Many disadvantages are incident to this type of heating for a bathroom, in that the heater not only takes up space in the room but is usually placed in a position where the bather will invariably come into contact with the stove, and be badly burned. Furthermore, in the extreme cold months, it is a tendency of individuals to leave the bathroom heater on during the night in order to keep the bathroom heated at all times. This is very dangerous because there is a possibility of the gas flame being blown out by a normal circulation of air, thus endangering the occupants of the house to the possibility of asphyxiation from the gas. Furthermore, this type of heater has many aspects of a fire hazard, due to a bather tossing a towel or article of clothing on or near the gas heater.

In bathrooms which are heated by a radiator or the like from a steam heating system or like heating system for the house, the radiators and their necessary connections present an unsightly appearance by their unconcealed fixtures and fittings. Also, such radiators occupy unnecessary floor space, and are not insulated so that the bather is subjected to the possibility of becoming burned in a manner similar to the gas type heater. Furthermore, in such a heating apparatus, it is connected to the house heating plant and therefore necessary that the heating plant be in operation to supply heat. This has its disadvantages in that at certain times of the year, such as early spring and late fall, it is desirous to have the bathroom heated, yet the weather is not sufficiently cold to warrant the operation of the home heating plant.

It is therefore an important object of this invention to provide a heating unit for a bathroom which is connected to the hot water circulating system independently from the home heating system, thus utilizing the same hot water that supplies the bathroom fixtures for supplying heat to the bathroom anytime there is hot water present in the hot water tank and its hot water circulating system.

A further object of this invention is to provide a lavatory pedestal cabinet having a heating unit encased therein for heating a bathroom, which saves floor space in the bathroom by utilizing the seldom used space beneath the lavatory, and wherein the heating means encased in the cabinet is so insulated from the cabinet and lavatory to prevent the possibility of the cabinet or lavatory from becoming hot enough, either by conduction, convection or radiation, to burn a moist skin.

An additional object of the invention is to provide a combined lavatory pedestal cabinet and heater that conceals all unsightly pipes, traps and fittings for the heater and lavatory, the pedestal cabinet having unique adjustable features making it adaptable to almost any type of lavatory, and said cabinet so constructed to provide a sanitary fixture whereby water, dirt or other debris that accumulates on the fixture can be easily removed.

And still a further object of the invention is to provide a heating apparatus for a bathroom that is healthful in that it does not burn up the oxygen in the bathroom air, and is maintained at such a temperature that will not cause deterioration of the bathroom decorations, is economical and durable in that there is less equipment to purchase, keep in repair and depreciate.

Other objects and advantages of my invention will be evident from the following detailed description read in conjunction with the accompanying drawings which illustrate one form of my new invention.

Figure 1:
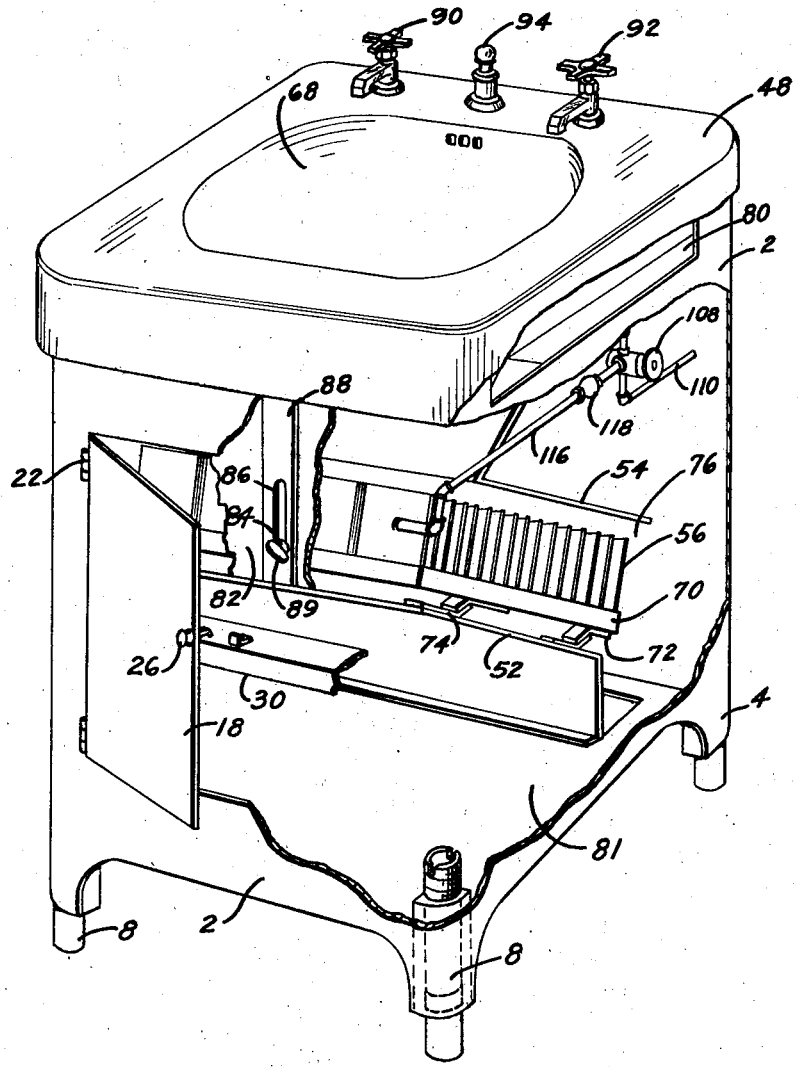
Fig. 1 is a perspective view of the device with certain parts broken away to show the radiator housing and radiator encased in the pedestal cabinet, and the lavatory supported on the cabinet.
Figure 2:
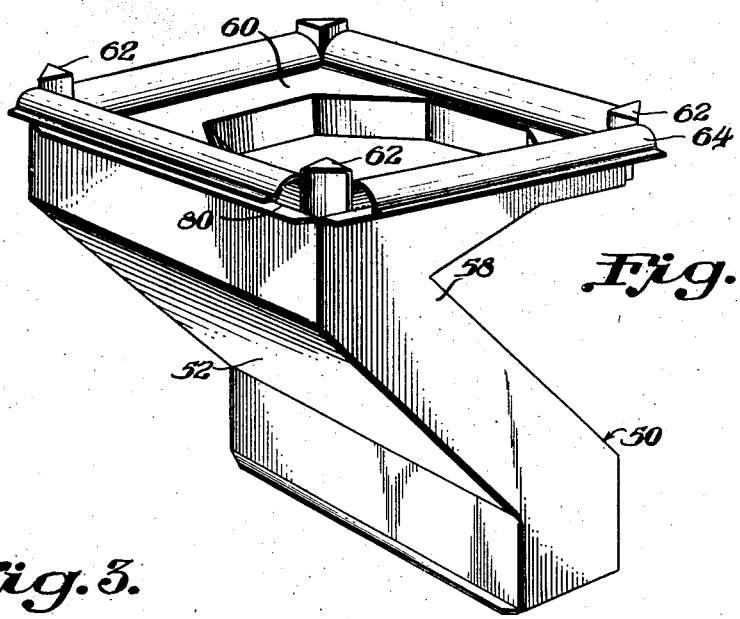
Fig. 2 is a perspective view of the housing for the radiator.
Figure 3:
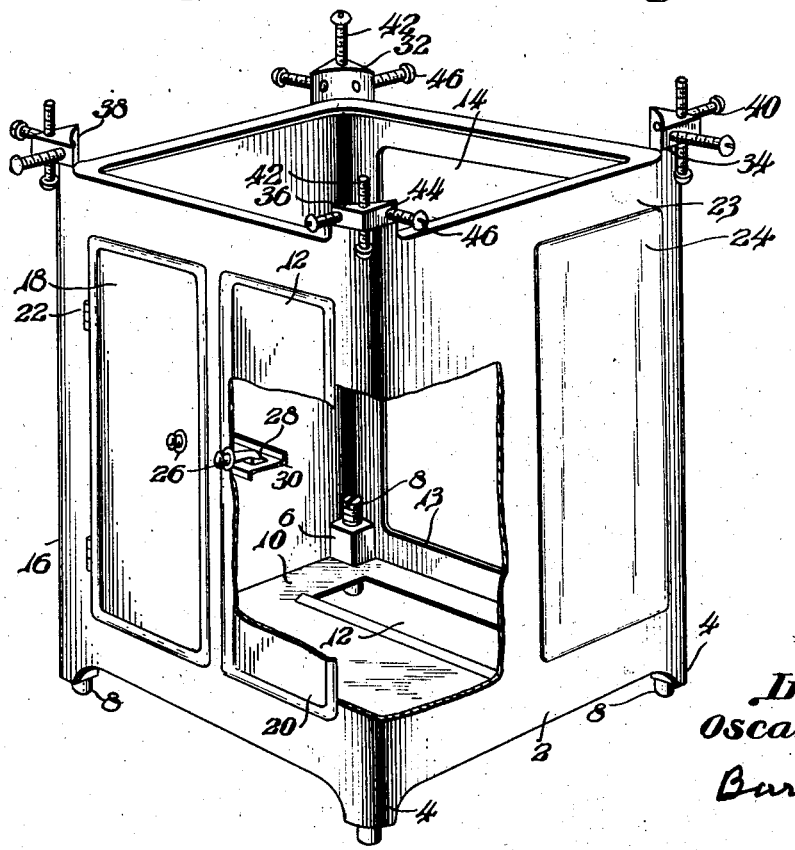
Fig. 3 is a perspective view of the pedestal cabinet with certain parts broken away.

Referring to the drawings in detail and more particularly Figs. 1, 2 and 3, the combined pedestal cabinet, lavatory and heating unit comprises a cabinet housing 2 of substantially rectangular shape to conform in general contour and dimensions to any standard lavatory being used today. The cabinet or housing 2 is constructed of sheet metal, which may have an exterior finish of porcelain, enamel, paint or the like, but it will be understood that the housing may be constructed of cast iron, or any other metal, and having a finish as may be desired. The cabinet 2 is formed at each of the lower corners with a projection 4, each having welded thereto a metal corner piece 6 provided with a threaded aperture for receiving a threaded pipe 8, forming adjustable legs for the cabinet 2. From an inspection of Figs. 1 and 3, it will be seen that manual adjustment of the threaded legs 8 will level the pedestal cabinet to conform with any variations in the floor upon which it rests. The cabinet 2 has a base portion 10 secured thereto by welding or the like, said base 10 being constructed with a rectangular opening 12. The back wall 13 of the cabinet 2 is provided with an opening 14 for a purpose which will be hereinafter explained.

The front wall 16 of the cabinet 2 is provided with a pair of doors 18 and 20, secured thereto by conventional hinges 22 (Fig. 1). A side wall 23 of the cabinet 2 is provided with a door 24 in order to provide access to the fittings within the cabinet 2, as will be hereinafter set out. The doors 18 and 20 are provided with latch door knobs 26, cooperating with catches 28, provided on a horizontal shelf 30, welded to the inner side of the front wall 16. The top part of the cabinet 2, at each corner thereof, is formed with upstanding projections 32, 34, 36 and 38, respectively, each having a rounded outer face to which an angular bracket 40 is welded.

Figure 9:
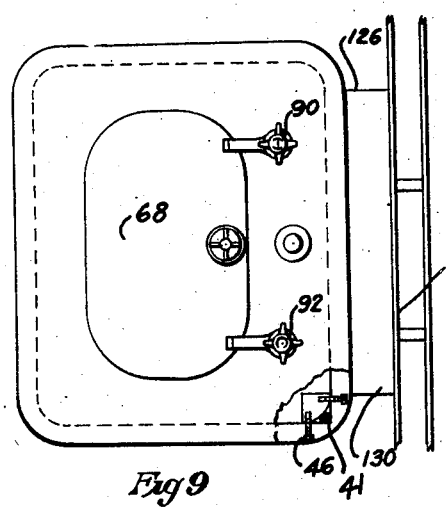
Fig. 9 is a plan view of the lavatory showing the adjusting screws in dotted lines for adjusting the lavatory to the pedestal cabinet.

A threaded nut 41 is welded between each of the brackets 40 and the projections, and each nut is adapted to receive a threaded stud 42. Each of the upstanding corner projections and the brackets are provided with threaded apertures 44 for receiving horizontally disposed threaded studs 46, as will be apparent from an inspection of Figs. 3 and 9. The threaded studs 42 and 46 are for the purpose of adjusting a lavatory 48 which is adapted to be supported by the pedestal cabinet 2.

Figure 6:
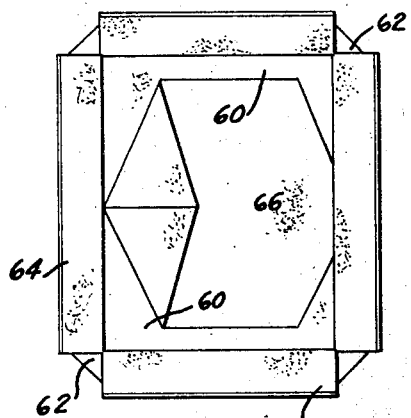
Fig. 6 is a plan view of the radiator housing.
Figure 7:
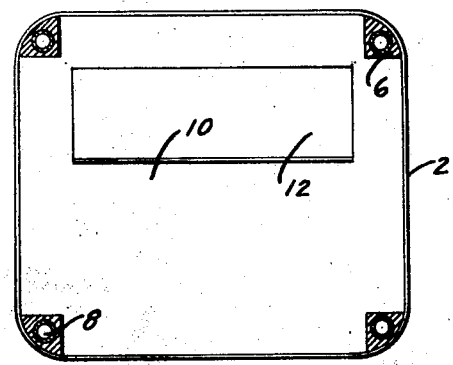
Fig. 7 is a sectional view of the pedestal cabinet taken on lines 7—7 of Fig. 5.
Figure 10:
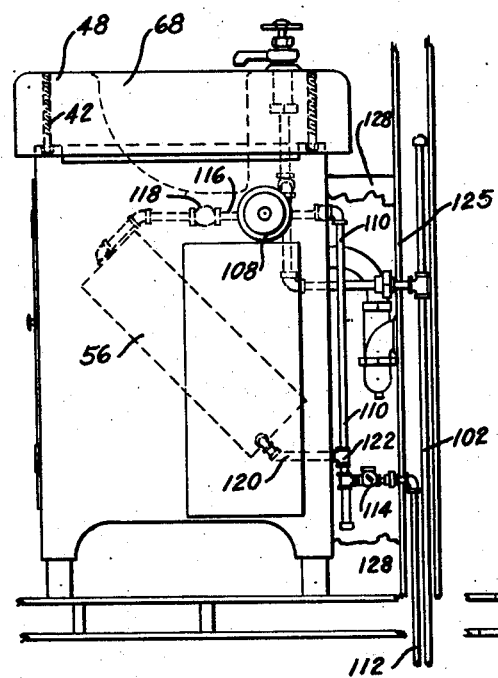
Fig. 10 is a side elevational view of the combined lavatory and pedestal cabinet showing the fittings and connections for the lavatory and heating unit.

Referring to Fig. 2, a radiator or heater housing 50 adapted to fit within the cabinet 2 comprises a front section 52 and back section 54, constructed in such a manner wherein a radiator or heater 56 may be disposed at approximately a 45 degree angle to the horizontal therein. The sections 52 and 54 are closed by the side sections 58 welded thereto to form the housing 50. A top section 60 is formed with angled corner pieces 62 and welded to the housing 50. A plurality of curved spring members 64 are welded to the outer edges of the section 60 between a pair of corner pieces 62 and overlying the outer extremities of the housing 50. The top section 60 of the housing is provided with an irregular shaped aperture 66, which, from an inspection of Figs. 1, 6 and 10, provides space for the lavatory bowl, or basin 68 to fit therein.

The radiator 56 is preferably a continuous coil type having copper fins for use with hot water, but it will be understood that any type of heater, steam, gas, or oil may be employed in the housing. The radiator 56 is adapted to be supported in the interior of the housing 50 by a pair of cradle members 70, each provided with a pair of angular brackets 72 cooperating with complementary angular brackets 74, welded to the inner face of the front section 52 of the housing 50. It will be understood that the cradle members 70 only support the outer extremities of the radiator 56, allowing substantially all of the radiator to be exposed.

Figure 4:
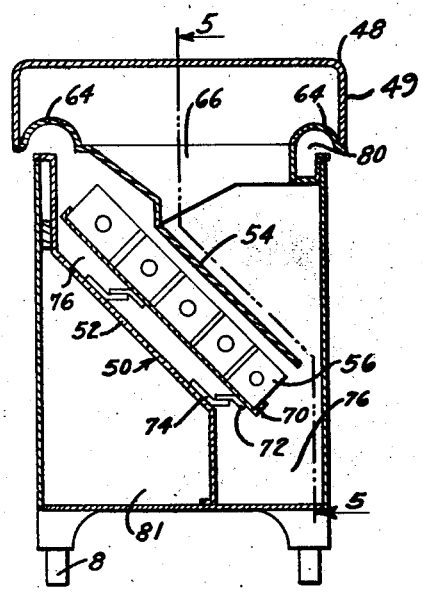
Fig. 4 is a sectional elevational view of the device showing the radiator housing and radiator supported in the pedestal cabinet.
Figure 5:
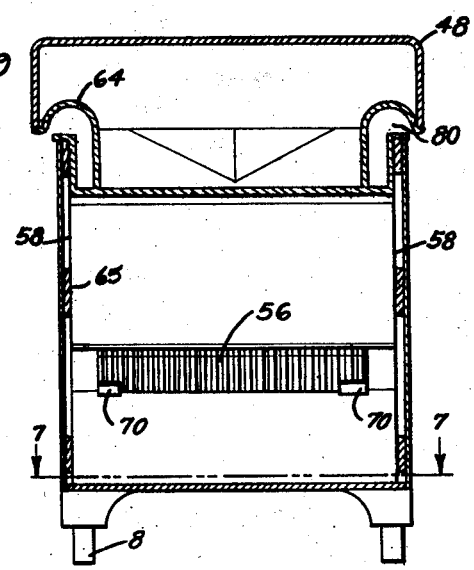
Fig. 5 is a sectional view similar to Fig. 4 taken on lines 5—5 of Fig. 4.

With the particular construction of the housing 50 for the heater 56, as shown in Figs. 4 and 5, the top section 60 and wing members 64 form a passageway 80 encircling the upper portion of the housing 50. With the housing 50 disposed within the cabinet 2, this air space or passageway 80 in conjunction with the interior 76 of the housing 50 allows for air that is circulating in the room, and especially under the cabinet 2, to pass through the aperture 12, the radiator 56 in the interior 76, around the air space 80, and under the four spring members into the room.

From an inspection of Fig. 1, it will be apparent that the lower part of the housing 50 is disposed over the aperture 12 of the base 10 (see Figs. 1 and 4). It will be understood that the dimensions of the housing 50, with respect to the cabinet 2, are such that easy removal of the housing 50 is provided, yet providing a substantial rigidity of the housing 50 within the cabinet 2.

With the housing 50 disposed within the cabinet 2, the lavatory 48 is then placed over the cabinet and is supported by the adjustable screws 42, the housing 50, and spring members 64. The flexibility of the spring members 64 allows them to bear flush against the extreme outer and underedge of the lavatory apron 49. It will be understood at this point that the housing cabinet 50, as well as the top section 60 and spring members 64, may be constructed from asbestos board or other non-conducting material, or as in the present instance, from sheet metal which has an insulated material such as sheet asbestos secured thereto by heat and moisture resisting glue, cement or the like. Non-conducting spacer blocks 65 are placed between the housing 50 and cabinet 2 in order to maintain an even air spacing between the walls of the cabinet and the housing.

From the foregoing, it will be apparent that with the disposition of the radiator housing within the cabinet 2 and the lavatory 48 disposed thereon, an apparatus has been provided which, with a heating medium supplied to the radiator 56, the circulation of air through the aperture 12 and the interior 76 of the housing 50, the air will be heated by the radiator and circulated from the interior 76 through the air spaces 80, and thus allow heated air, at sufficiently high temperature, to enter the bathroom from the under-edges of the lavatory 48, while at the same time being insulated so that no portions of the cabinet 2, nor the lavatory 48 can become hot, whereby an unclad bather may become burned upon contacting either the cabinet or lavatory.

It will be noted from an inspection of Figs. 1 and 4, that with the housing disposed within the cabinet 2, the cabinet not only acts as a housing and concealing means for the heater, but also has a storage space 81 in the front part of the cabinet which is accessible by the doors 18 and 20 to provide sufficient space in the cabinet for many purposes. In case it is desired to prevent heated air from discharging from the front side of the lavatory, the housing 50 is constructed with a sheet metal damper 82 secured to a stud 84, said stud being slidable in a slot 86 of a bar 88 secured to the housing 50. The damper 82 can be adjusted by the stud and held in adjusted position by a nut 89.

Figure 11:
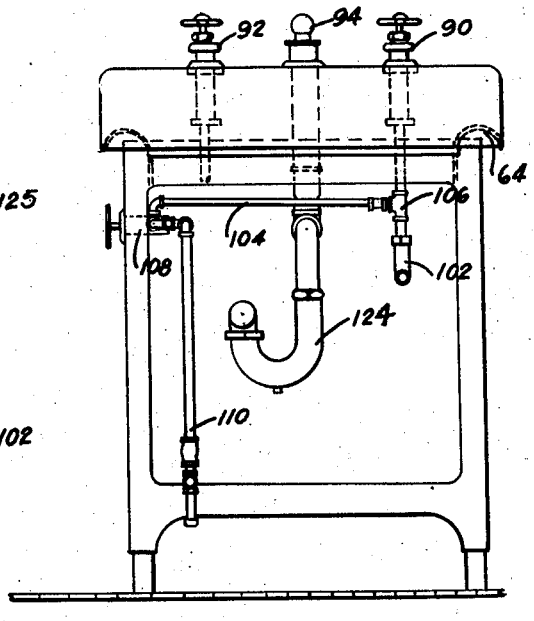
Fig. 11 is a rear elevational view similar to Fig. 10.

With the radiator 56 in place in the housing, and the lavatory 48 supported on the cabinet 2, the heating system for supplying the heating medium to the heater 56 will now be explained. The lavatory 48 comprises the usual hot and cold water faucets 90 and 92, respectively, and the conventional drain valve 94. The radiator 56 is supplied with hot water from the same hot water system that supplies the lavatory 48, which is independent of the heating system for the building. From an inspection of Fig. 8, the hot water tank 96, in the basement of the building 97, is supplied with cold water by a pipe or conduit 98 from a source of city water supply (not shown). The conduit 98 extends a substantial distance into the tank 96 and discharges water therein, which is heated by a heater 100. A lavatory and radiator supply conduit 102 extends from the top of the tank 96, through the floor 99, into communication with the hot water faucet 90 (see Figs. 10 and 11). The water is circulated from the T-fitting 106 through a return line 104 being in communication with a two-way valve 108.

From the two-way valve 108, the hot water is circulated through a by-pass conduit 110 connected to a return conduit 112 by the fittings 114. A hot water supply pipe 116 for the radiator is in communication with the valve 108, and enters the radiator 53 at the top portion thereof. A thermostatic valve 118 may be placed in the pipe 116 for arresting the flow of water into the radiator by closing the valve 118 after a predetermined temperature is reached within the upper portion of 76 and air passage 80, said valve 118 to be controlled by a thermostatic element (not shown) placed within the upper portion of 76 or 80, thus assuring that the heated air delivered to the room will not become too hot.

A discharge or outlet pipe 120 for the radiator is in communication with the by-pass 110 by the T-fitting 122, which also provides communication with the return line 112. The lavatory 48 has the usual drain pipe 124. The drain pipe as well as the supply and return pipes are provided with conventional slip joints (not shown) in order that any vertical adjustment of the lavatory can be facilitated. It will be apparent that with a supply of hot water from the tank 96 through the supply pipe 102 to the hot water faucet 90 and with the valve 108 closed off against the radiator, the water will circulate through the supply line 102, pipe 104, by-pass 110 and return line 112 back to the tank 96. In order to utilize the hot water that is circulated through the system as a medium for supplying heat to the radiator 56, it is only necessary that the valve 108 be manipulated to allow for circulation of the hot water from the pipe 104, through the valve 108, pipe 116, radiator 56, pipe 120, back to the return line 112 and the tank 96. With the circulation of the hot water through the radiator 56, it will be apparent that the normal circulation of air in a room will pass through the aperture 12 in the cabinet into the interior of the housing 50, wherein the air will become heated due to the hot water medium in the radiator 56, and the heated air will rise and pass into the air ducts 80 around the housing 50 and immediately below the lavatory 48 so that air may be discharged at all four sides of the lavatory, and thus provide a heating medium for the room.

Figure 8:
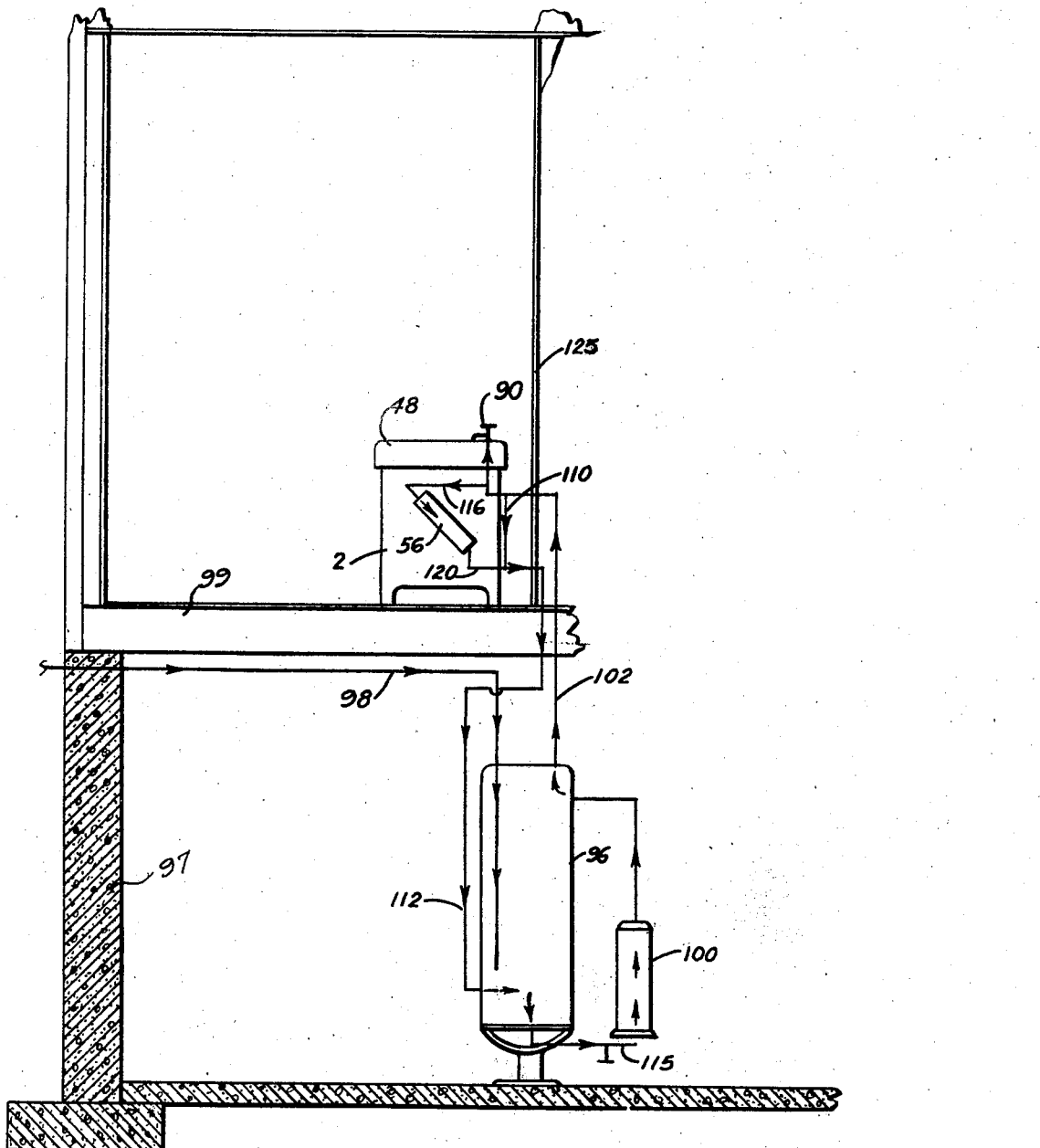
Fig. 8 is a schematic view showing the gravity circulating heating system for supplying the heat to the radiator in the pedestal cabinet.

It is thought that an explanation of the hot water system as disclosed in Fig. 8 might be advantageous. In this system, the supply pipe 102 is slightly larger in diameter than the return line 112, in order that frictional resistance will be minimized and assure a constant circulation of the water. With the heater 100 heating the water in the tank 96, the water is expanded to cause circulation throughout the system. It has been found that air pockets are sometimes present in the cold water supply, and since this system is free of all air locks, traps and other incidental fittings, in order to exhaust any air that accumulates in the system, it is only necessary that the hot water faucets 90 be opened and allow the air to exhaust there-through. The water will circulate through the supply pipe 102 back through the return line 112 to the tank 96 as long as there is a difference in the temperature of the water in the pipe 102 and pipe 112. A drain line 115 is provided for the tank.

With the combined lavatory, pedestal cabinet and heater properly connected to the hot water supply system of the house, the various fittings, especially the drain pipe 124, create a space between the back wall 13 of the cabinet 2 and the wall 125 of the room. In order to conceal all unsightly pipes and fittings, and also prevent debris from accumulating thereon, the opening 14 of the cabinet 2 receives a pair of side plates 126 and 128, having a top section 130 forming a housing to conceal the pipes. The plates are provided with adjustable notches (not shown) for anchoring them to the wall 13. In position, the plates lie flush with the wall 125 to provide a snug fit. In this manner any dirt or the like cannot accumulate where it cannot be easily removed.

Figure 12:
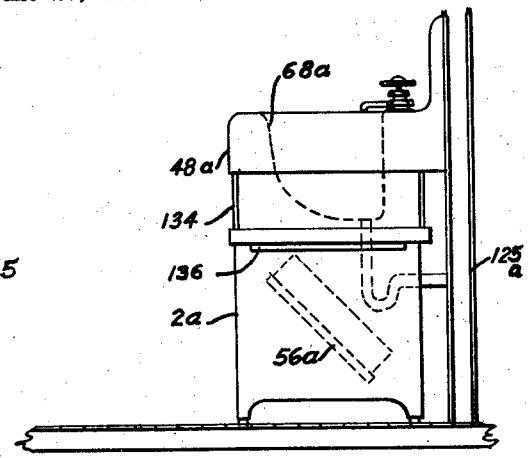
Fig. 12 is a modified view showing a combined pedestal cabinet and heating unit adapted to fit under a conventional lavatory but separate therefrom.

In Fig. 12, a modified form of the device is disclosed. In many cases it is desired to provide a combined pedestal cabinet and heater for use with a conventional lavatory already installed. In such instances a pedestal cabinet 2a and heater 56a is provided, with the cabinet 2a of a decreased height in order to fit under the lavatory basin 68a. The construction of the cabinet 2a and the heater 56a is substantially identical with that shown in the preferred embodiment except that the spring pieces 64 are eliminated and legs 134 are provided to support the lavatory 48a on the cabinet 2a. The heated air circulates through the cabinet 2a and passes through a plurality of openings 136 provided in the cabinet 2a.

From the foregoing, it will be apparent that a safe, sanitary and beautiful heating fixture has been provided for the bathroom which utilizes the equipment for supplying hot water to the bathroom fixtures to also heat the bathroom, thus performing a dual service, without one service interfering with the other, a fixture that provides storage space as well as saving floor space, a fixture which is so insulated that the unclad bather cannot become burned, a fixture that will eliminate the possibility of asphyxiation from open flame heaters and hot water heaters placed in poorly ventilated bathrooms.

It is believed that the construction, arrangement of parts, and the operation of the device will be clear to those skilled in the art and it is obvious that changes may be made in the details disclosed without departing from the spirit of the invention as expressed in the claims.

What I claim is:

1. In a combination cabinet and lavatory, a housing disposed within the cabinet, an aperture in the base of the cabinet in communication with an open lower end of the housing, said housing having outwardly extending curved spring members adjacent its top portion and adapted to bear against the lower edges of the lavatory to provide a passageway, said housing and spring members being insulated to prevent heating of the cabinet and lavatory, a heater disposed in the housing for heating circulated air to be discharged from the passageway, a hot water supply and return circuit for the lavatory, means connecting the heater with the hot water circuit.

2. In a combination cabinet and lavatory, a housing disposed within the cabinet, an aperture in the base of the cabinet in communication with an open lower end of the housing, said housing having outwardly extending curved spring members adjacent its top portion and adapted to bear against the lower edges of the lavatory to provide a passageway, said housing and spring members being insulated to prevent heating of the cabinet and lavatory, a heater disposed in the housing for heating circulated air to be discharged from the passageway, a hot water supply and return circuit for the lavatory, a conduit connecting the heater with the hot water circuit for supplying a heating medium to the heater.

3. In a combination cabinet and lavatory, a housing disposed within the cabinet, an aperture in the base of the cabinet in communication with an open lower end of the housing, said housing having outwardly extending curved spring members adjacent its top portion and adapted to bear against the lower edges of the lavatory to provide a passageway, said housing and spring members being insulated to prevent heating of the cabinet and lavatory, a heater disposed in the housing for heating circulated air to be discharged from the passageway, a hot water supply and return circuit for the lavatory, means connecting the heater with the hot water circuit for supplying a heating medium to the heater, means for controlling the supply of hot water to the heater.

4. In a bathroom fixture comprising a cabinet having an insulated housing disposed therein, a lavatory adapted to be supported by the cabinet and housing, an aperture provided in the base of the cabinet in communication with the housing, means for leveling the cabinet with the floor, means provided on the cabinet for adjusting the lavatory with respect to the cabinet and housing, means forming a passageway at a point adjacent the lower edge of the lavatory apron, a heater disposed in the housing for heating circulating air to be discharged from the passageway.

5. In a bathroom fixture comprising a cabinet having an insulated housing disposed therein, a lavatory adapted to be supported by the cabinet and housing, an aperture provided in the base of the cabinet in communication with the housing, adjustable legs for leveling the cabinet with the floor, means provided on the cabinet for adjusting the lavatory with respect to the cabinet and housing, means forming a passageway at a point adjacent the lower edge of the lavatory apron, a heater disposed in the housing for heating circulating air to be discharged from the passageway, a domestic hot water circuit for the lavatory, means for connecting the heater to the hot water circuit.

6. In a bathroom fixture comprising a pedestal cabinet for supporting a lavatory, a housing disposed within the cabinet, and having a top section for assisting the support of the lavatory, said housing constructed with its central body portion disposed diagonally in the cabinet, an aperture in the base of the cabinet in communication with a lower opening in the housing, a plurality of brackets secured in the housing for supporting a plurality of cradle members, a radiator supported by the cradle members and disposed in the housing in a position parallel with the central body portion of the housing.

7. In a bathroom fixture comprising a pedestal cabinet for supporting a lavatory, a housing disposed within the cabinet and having a top section for assisting the support of the lavatory, said housing constructed with its central body portion disposed diagonally in the cabinet, an aperture in the base of the cabinet in communication with a lower opening in the housing, a plurality of brackets secured in the housing for supporting a plurality of cradle members, a radiator supported by the cradle members and disposed in the housing in a position parallel with the central body portion of the housing, a hot water supply and return circuit for the lavatory, means for connecting the radiator with the hot water circuit for supplying a heating medium to the radiator.

8. In a bathroom fixture comprising a pedestal cabinet for supporting a lavatory, a housing disposed within the cabinet, said housing constructed with its central body portion disposed diagonally in the cabinet to provide a storage space in the front of the cabinet, an aperture in the base of the cabinet in communication with a lower opening in the housing, a plurality of brackets secured in the housing for supporting a plurality of cradle members, a radiator supported by the cradle members and disposed in the housing in a position parallel with the central body portion of the housing, a hot water supply and return circuit for the lavatory, means for connecting the radiator with the hot water circuit for supplying a heating medium to the radiator.

9. In a bathroom fixture, a cabinet having an insulated housing disposed therein and adapted to be positioned beneath a lavatory, an aperture in the base of the cabinet in communication with the housing, a top section for the housing so constructed to provide an insulated passageway surrounding the housing and adjacent the lower edges of the lavatory, a heater disposed in the housing for heating circulated air to be discharged through the passageway, means for connecting the heater to the domestic hot water supply and return circuit of the lavatory.

10. In combination a cabinet, a housing disposed therein, and a lavatory supported by the cabinet and housing, said cabinet having an aperture in the base in communication with an open lower end of the housing, said housing formed with a top section supporting the lavatory and having outwardly extending curved spring members adapted to bear against the lower edges of the lavatory to provide an air passage, a heater disposed in the housing for heating circulating air to be discharged from the air passage.

11. In combination a cabinet, an insulated housing disposed therein, a lavatory supported on the cabinet and housing, said cabinet having an aperture in the base portion in communication with the housing, said housing having an insulated top section so constructed to form a passageway encircling the top portion of the housing and adjacent the lower edge of the lavatory, a heater disposed in the housing whereby air circulating through the housing will become heated and discharged from the passageway.

12. In a bathroom fixture comprising a cabinet for supporting a lavatory, a heating compartment for the cabinet comprising an insulated housing disposed therein and provided with an opening in communication with an opening in the bottom of the cabinet, said housing being provided with an insulated passageway beneath the lavatory, a radiator disposed in the heating compartment of the housing and supported by cradle members resting on angled brackets, said radiator having substantially all its heating surface exposed in the heating compartment for heating circulating air to be discharged through the passageway beneath the lavatory.

13. In a combination cabinet and lavatory, a housing disposed within the cabinet, an aperture in the base of the cabinet in communication with an open lower end of the housing, said housing having outwardly extending curved spring members adjacent its top portion and adapted to bear against the lower edges of the lavatory to provide a passageway, said housing and spring members being insulated to prevent heating of the cabinet and lavatory, a heater disposed in the housing for heating circulated air to be discharged from the passageway, an opening in the back wall of the cabinet, a hot water supply and return circuit for the lavatory extending through the opening, means connecting the heater with the hot water circuit for supplying a heating medium to the heater, means for controlling the supply of hot water to the heater, plate means cooperating with the cabinet for concealing the hot water circuit.

14. In a combination cabinet and lavatory, a housing disposed within the cabinet, an aperture in the base of the cabinet in communication with an open lower end of the housing, said housing having outwardly extending curved spring members adjacent its top portion and adapted to bear against the lower edges of the lavatory to provide a passageway, said housing and spring members being insulated to prevent heating of the cabinet and lavatory, a heater disposed in the housing for heating circulated air to be discharged from the passageway, an opening in the back wall of the cabinet, a hot water supply and return circuit for the lavatory extending through the opening, means connecting the heater with the hot water circuit for supplying a heating medium to the heater, means for controlling the supply of hot water to the heater, plate means cooperating with the cabinet for concealing the hot water circuit, means for controlling the temperature of the heated air in the housing and passageway.

15. In a bathroom fixture, a cabinet having a housing disposed therein and adapted to be positioned beneath a lavatory, an aperture in the base of the cabinet in communication with the housing, the housing so constructed to provide a passageway beneath the lower edges of the lavatory, a heater disposed in the housing for heating circulated air to be discharged through the passageway, means for connecting the heater to the domestic hot water supply and return circuit of the lavatory.

16. In combination a cabinet, a housing arranged therewith, said cabinet and housing adapted to be disposed beneath a lavatory, said cabinet having an aperture in the base portion in communication with the housing, said housing having a portion so constructed and arranged to form a passageway beneath the lower edge of the lavatory, a heater disposed in the housing whereby air circulating through the housing will become heated and discharged from the passageway.

17. In combination, a lavatory basin, a cabinet arranged beneath the basin and provided with a lower air inlet and an upper air outlet, said outlet being positioned below the lower edge of the basin, a passageway in the cabinet placing the inlet and outlet in communication with one another, a heater arranged within said passageway, and means for connecting the heater to a domestic hot water supply and return circuit.

OSCAR G. WATT.